(12) United States Patent
Hou

(10) Patent No.: US 7,602,730 B1
(45) Date of Patent: Oct. 13, 2009

(54) SYSTEMS AND METHODS FOR TRANSITIONING BETWEEN FRAGMENTATION MODES

(75) Inventor: Victor Hou, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1490 days.

(21) Appl. No.: 10/241,686

(22) Filed: Sep. 12, 2002

(51) Int. Cl.
H04L 12/26 (2006.01)

(52) U.S. Cl. .................. 370/252; 370/352; 370/465; 370/468; 370/474; 370/480

(58) Field of Classification Search .......... 370/252, 370/352, 465, 468, 474, 480; 725/111, 129
See application file for complete search history.

(56) References Cited

U.S. PATENT DOCUMENTS 6,529,520 B1 * 3/2003 Lee et al. ............... 370/442
6,763,032 B1 * 7/2004 Rabenko et al. ......... 370/442
6,834,057 B1 * 12/2004 Rabenko et al. ......... 370/468
6,950,399 B1 * 9/2005 Bushmitch et al. ...... 370/236
7,103,065 B1 * 9/2006 Quigley et al. .......... 370/465

OTHER PUBLICATIONS

Data-Over-Cable Service Interface Specifications, Radio Frequency Interface Specification, SP-RFIv1.1-I08-020301, Issued Specification, Mar. 1, 2002, pp. 72, 73, and 165-171.

* cited by examiner

Primary Examiner—William Trost, IV
Assistant Examiner—Toan D Nguyen
(74) Attorney, Agent, or Firm—Harrity & Harrity, LLP

(57) ABSTRACT

A cable modem termination system that connects to cable modems includes a scheduler and a system manager. The scheduler schedules transmission opportunities for the cable modems and operates in multiple fragmentation modes. The scheduling of transmission opportunities by the scheduler differs among the fragmentation modes. The system manager compares one or more processing parameters associated with the cable modem termination system to one or more thresholds and causes the scheduler to transition among the fragmentation modes based on a result of the comparison.

24 Claims, 5 Drawing Sheets

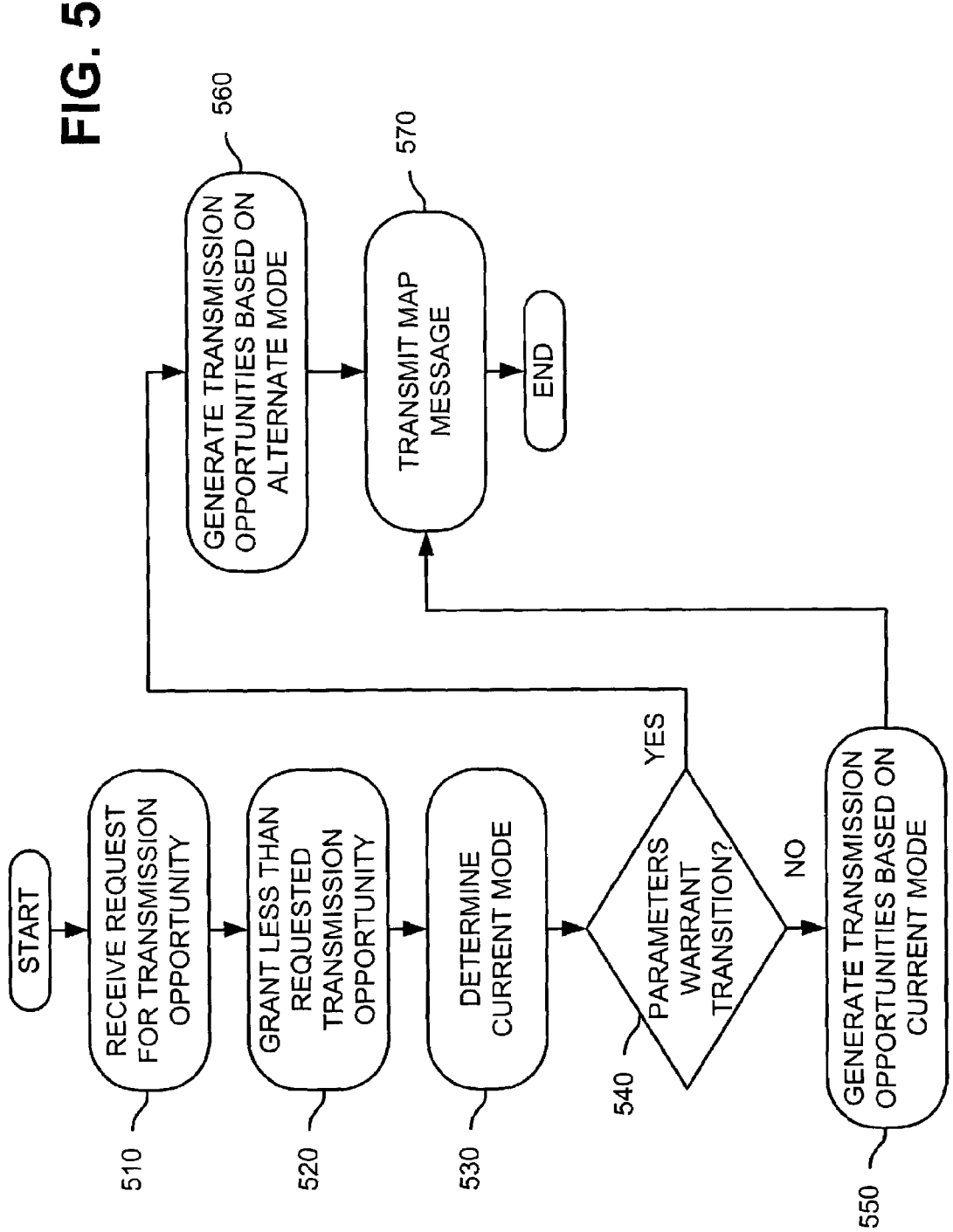

SYSTEMS AND METHODS FOR TRANSITIONING BETWEEN FRAGMENTATION MODES

BACKGROUND OF THE INVENTION

1. Field of the Invention

The present invention relates generally to data transfer and, more particularly, to systems and methods for transitioning between fragmentation modes.

2. Description of Related Art

Conventional cable modem systems include a cable modem termination system connected to one or more cable modems via a coaxial cable. The cable modem termination system communicates with the cable modems via a radio frequency (RF) interface and provides packet forwarding functions via a network side interface. Separate frequency bands are used for upstream and downstream communication on the coaxial cable. For example, the upstream communication may take place on communication channels within the 5-42 MHz frequency band and the downstream communication may take place on communication channels within the 88-860 MHz frequency band.

The upstream communication path (i.e., from the cable modems to the cable modem termination system) uses frequency time division multiple access (TDMA) communication. The cable modems transmit variable length packets (e.g., 64 to 1,518 byte packets) on one or more service flows that have associated levels of quality of service.

When a cable modem has data to transmit on an upstream communication channel, it sends a request packet in a certain time slot to the cable modem termination system requesting a specific amount of bandwidth or number of time slots in order to transmit the data. The cable modem termination system then schedules certain time slots in which the cable modem can transmit its data. For example, the cable modem termination system sends a message to the cable modem informing the cable modem that it has been granted a time slot beginning at some point in time and continuing for so many time slots. When the cable modem termination system allocates a transmission opportunity to the cable modem which is less than the cable modem asked for, the cable modem can only send a portion of its packet in the time slot(s). The cable modem sends the rest of the packet in one or more later time slots. This is called "fragmentation."

Data-Over-Cable Service Interface Specification (DOCSIS) is the standard for cable modem systems throughout the world. DOCSIS defines fragmentation for upstream transmissions from the cable modems. The cable modem termination system initiates fragmentation whenever the cable modem termination system grants fewer time slots than what the cable modem requested. The purpose of fragmentation is to help ensure that best-effort and unsolicited grant service flows can co-exist effectively on the same communication channel.

DOCSIS defines two modes of fragmentation: (1) piggyback mode; and (2) multiple grant mode. In the piggyback mode, a cable modem requests N time slots for transmission of a packet of data and the cable modem termination system grants some number of time slots less than the N time slots requested by the cable modem. The cable modem determines how many more time slots it needs to send the rest of the packet. The cable modem then makes another request for the rest of the time slots it needs. The cable modem makes this request within the header of the first fragment it sends during the allocated time slots, thus piggybacking the request on the transmission of the first fragment. In response to the request, the cable modem termination system may grant enough time slots for all, or less than all, of the remaining packet data.

In the multiple grant mode, a cable modem requests N time slots for transmission of a packet of data. In this case, the cable modem termination system realizes that it cannot grant N time slots to the cable modem. The cable modem termination system then grants some number of time slots less than N and keeps track of how many more additional time slots are needed by the cable modem. The cable modem termination system then grants these additional time slots, thus providing multiple grants to the cable modem. The cable modem termination system may make these multiple grants via a single message called a MAP message or in multiple MAP messages.

Each of these modes has its advantages and disadvantages. For example, in the piggyback mode, the cable modem termination system does not need to keep track of how much data a cable modem has left to send (or how many time slots the cable modem still needs to send this data), thereby offloading some of the processing from the cable modem termination system. The cable modem termination system does this at the cost of latency. It may take many cycles of the cable modem sending requests and fragments and the cable modem termination system granting time slots until the cable modem can transmit the entire packet. As a result, the overall transmission time for a packet may be many times greater than sending the packet without fragmentation.

In the multiple grant mode, the cable modem termination system keeps track of how much data a cable modem has left to send (or how many time slots the cable modem still needs to send this data). This increases the processing required by the cable modem termination system. Latency, however, is greatly reduced. The cable modem termination system may transmit multiple grants to the cable modem in the same message.

DOCSIS allows the cable modem termination system to support either fragmentation mode. All compliant cable modems are able to support either mode. In practice, however, only one of the fragmentation modes is typically used.

Because each of the fragmentation modes has certain advantages and disadvantages, a need exists for systems and methods that minimize the disadvantages and maximize the advantages of these modes.

SUMMARY OF THE INVENTION

Systems and methods consistent with the principles of the invention address this and other needs by providing mechanisms by which a cable modem termination system may determine which fragmentation mode to use. The cable modem termination system may base its determination on a set of parameters, such as processor utilization, traffic load, and the number of cable modems and/or service flows.

One aspect consistent with the principles of the invention includes a cable modem termination system that connects to cable modems and includes a scheduler and a system manager. The scheduler schedules transmission opportunities for the cable modems and operates in multiple fragmentation modes. The scheduling of transmission opportunities by the scheduler differs among the fragmentation modes. The system manager compares one or more processing parameters associated with the cable modem termination system to one or more thresholds and causes the scheduler to transition among the fragmentation modes based on a result of the comparison.

In another aspect consistent with the principles of the invention, a method for transitioning between first and second fragmentation modes in a cable routing system is provided. The method includes entering the first fragmentation mode; analyzing one or more processing parameters against one or more thresholds; and transitioning to the second fragmentation mode when at least one of the one or more processing parameters exceeds the one or more thresholds.

In yet another aspect consistent with the principles of the invention, a cable modem termination system that connects to cable modems includes a scheduler and a system manager. The scheduler schedules transmission opportunities for the cable modems and operates in a multiple grant mode and a piggyback mode at different times. The scheduling of transmission opportunities by the scheduler differs based on which of the multiple grant mode and the piggyback mode the scheduler is operating. The system manager instructs the scheduler to enter the multiple grant mode. The system manager compares one or more processing parameters to one or more thresholds and causes the scheduler to transition to the piggyback mode when at least one of the one or more processing parameters exceeds the one or more thresholds.

In a further aspect consistent with the principles of the invention, a cable modem termination system that connects to cable modems includes a scheduler and a system manager. The scheduler schedules transmission opportunities for the cable modems and operates in a multiple grant mode and a piggyback mode at different times. The scheduling of transmission opportunities by the scheduler differs based on which of the multiple grant mode and the piggyback mode the scheduler is operating. The system manager instructs the scheduler to enter the piggyback mode. The system manager compares one or more processing parameters to one or more thresholds and causes the scheduler to transition to the multiple grant mode when at least one of the one or more processing parameters is less than the one or more thresholds.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flowchart of exemplary processing by the cable modem termination system of FIG. 1 according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention permit a cable modem termination system to transition between the piggyback and the multiple grant modes. Because the multiple grant mode is more favorable to performance as perceived by the cable modem user, the cable modem termination system may operate in this mode as much as possible. The cable modem termination system may transition to the piggyback mode based on certain parameters, such as the processing load of the cable modem termination system.

System Configuration

Figure 1:
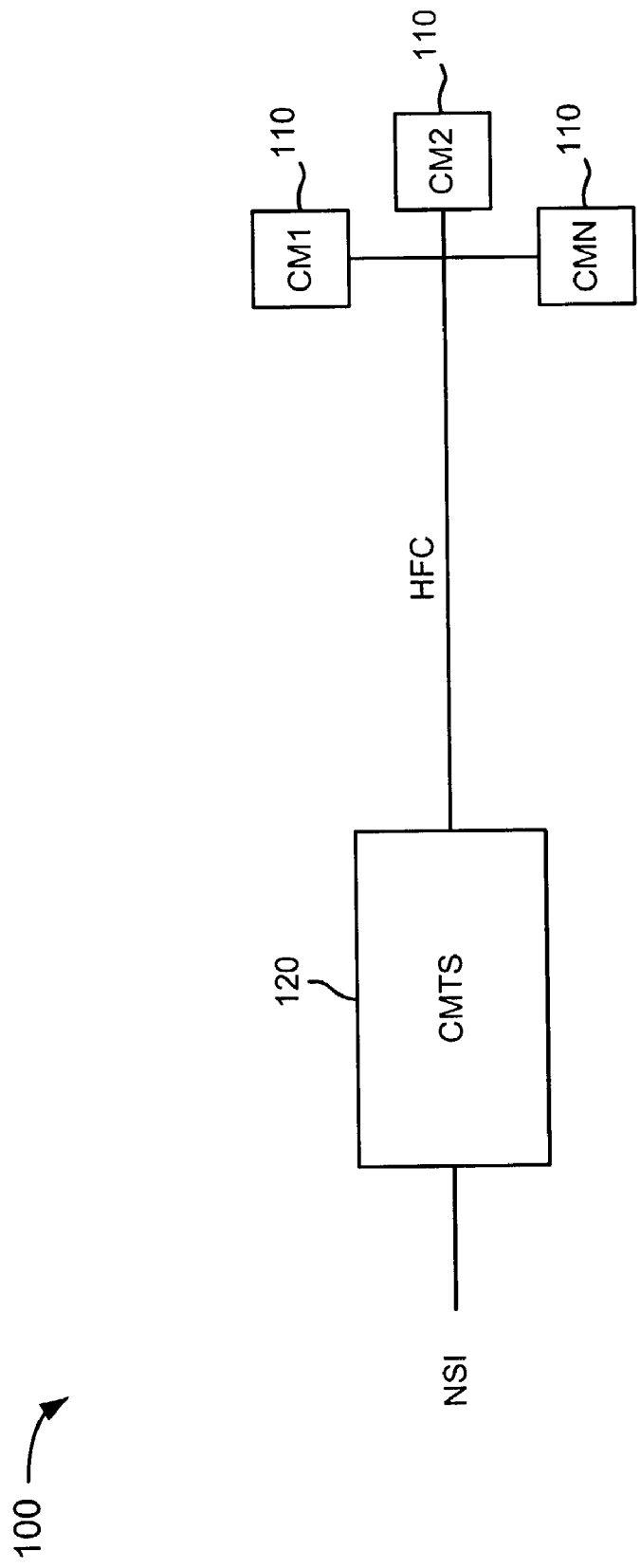
FIG. 1 is a block diagram illustrating an exemplary cable system in which systems and methods consistent with principles of the invention may be implemented.

FIG. 1 is a block diagram illustrating an exemplary cable system 100 in which systems and methods consistent with the principles of the invention may be implemented. System 100 may include N cable modems 110 (CM1-CMN, where N≧1) connected to a cable modem termination system (CMTS) 120 via a hybrid fiber coaxial cable (HFC). CMTS 120 may communicate with CMs 110 via a plurality of upstream and downstream communication channels and with a network, such as a wide area network, a local area network, the Internet, etc., via a network side interface (NSI).

CMs 110 may include conventional cable modems available from a number of manufacturers. CMs 110 may transmit packets to CMTS 120 via the upstream communication channels. CMs 110 may request transmission opportunities, possibly by requesting a certain number of time slots, from CMTS 120. CMTS 120 may grant some or all of the requested time slots. Granting less than all of the requested time slots leads to fragmentation.

Figure 2:
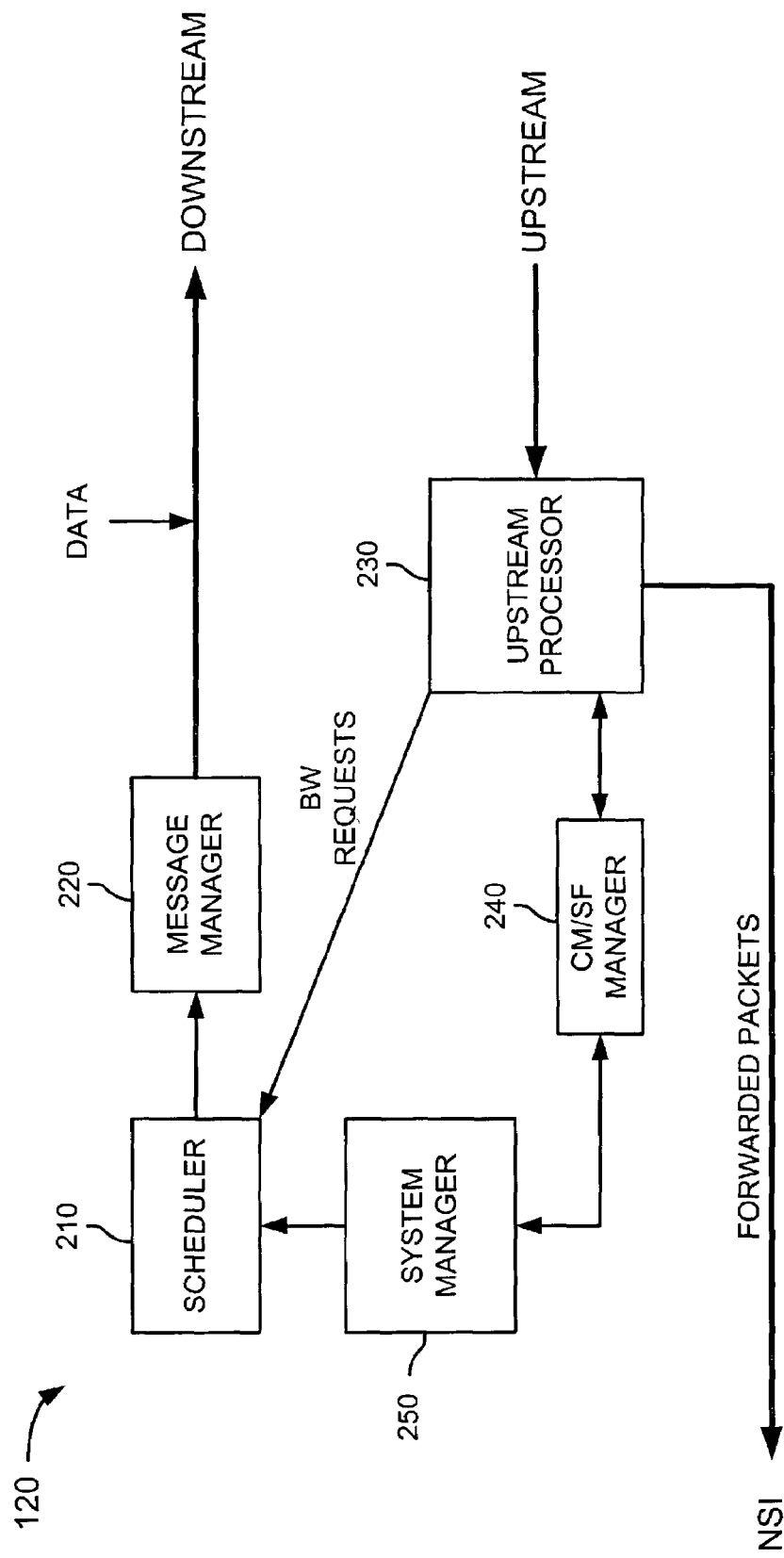
FIG. 2 is a detailed block diagram illustrating a portion of the cable modem termination system of FIG. 1 according to an implementation consistent with the principles of the invention.

FIG. 2 is an exemplary functional block diagram of CMTS 120 according to an implementation consistent with the principles of the invention. CMTS 120 may include a scheduler 210, a message manager 220, an upstream processor 230, a cable modem/service flow (CM/SF) manager 240, and a system manager 250. Message manager 220 may connect to the downstream path (from CMTS 120 to CMs 110). Upstream processor 230 may connect to the upstream path (from CMs 110 to CMTS 120).

Scheduler 210 may include logic that schedules transmission opportunities in the upstream direction. Scheduler 210 may receive requests for the transmission of packet data from CMs 110 and allocate transmission opportunities to CMs 110 for the transmission of some or all of the packet data. When scheduler 210 allocates transmission opportunities that are less than what CMs 110 requested, scheduler 210 may enter a fragmentation mode (i.e., piggyback or multiple grant mode) for these particular CMs 110. Scheduler 210 may operate in either of the fragmentation modes and may transition between the modes. The particular mode in which scheduler 210 operates may be determined by system manager 250, as described below.

Message manager 220 may include logic that receives information regarding the transmission opportunities allocated by scheduler 210 and generates MAP messages therefrom. Message manager 220 may control the packetization and form of the MAP messages. A MAP message is a downstream message that informs CMs 110 when to transmit on the upstream path.

The particular mode in which CMTS 120 is operating may be identified based on the MAP message. For example, if the MAP message includes only a single grant for CM 110 and this grant is insufficient to satisfy its request, then CMTS 120 is operating in the piggyback mode. If, on the other hand, the MAP message includes multiple grants for CM 110, then CMTS 120 is operating in the multiple grant mode.

Figure 3:
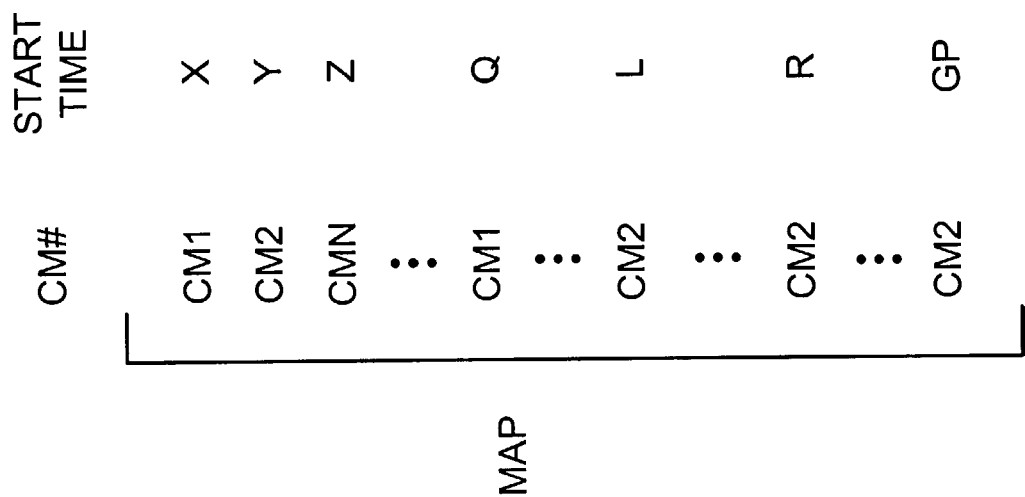
FIG. 3 is an exemplary diagram of a MAP message that may be generated by the message manager of FIG. 2 according to an implementation consistent with the principles of the invention.

FIG. 3 is an exemplary diagram of a MAP message that may be generated by message manager 220 according to an implementation consistent with the principles of the invention. The MAP message may include information that identifies CMs 110 and the transmission opportunities allocated to CMs 110. The information regarding the allocated transmission opportunities may include a start time of the transmission opportunities. The duration of a transmission opportunity may be deduced from the start time of the transmission opportunity and the start time of a subsequent transmission opportunity.

Assume for purposes of this example that CMTS 120 allocates two transmission opportunities to CM1 that are sufficient to satisfy CM1's request; CMTS 120 allocates three transmission opportunities to CM2 that are insufficient to satisfy CM2's request; and CMTS 120 allocates a single transmission opportunity to CMN that is sufficient to satisfy CMN's request. The MAP message in this example shows fragmentation in the multiple grant mode.

According to FIG. 3, CM1 has been granted two transmission opportunities (one at time X and another at time Q) that satisfy CM1's request. CM2 has been granted three transmission opportunities (one at time Y, another at time L, and yet another at time R) that are insufficient to satisfy CM2's request. In this case, the MAP message includes a grant pending (GP) that indicates that additional grants will be coming in a subsequent MAP message. CMN has been granted a single transmission opportunity (at time Z) that satisfies CMN's request. In the case of CMN, no fragmentation is necessary.

Returning to FIG. 2, message manager 220 may transmit the MAP message to CMs 110 on the downstream path. Downstream transmission may include data destined to CMs 110 in addition to the MAP messages.

Upstream processor 230 may include logic that separates data from control messages that it receives on the upstream path. Some of the control messages may include bandwidth (BW) requests (e.g., piggyback requests) for future transmission opportunities. Upstream processor 230 may also buffer fragments of a packet until it receives the entire packet. Once all of the fragments of the packet have been received, upstream processor 230 may reassemble the packet and transmit it via the network side interface.

CM/SF manager 240 may include logic that tracks information regarding what CMs 110 are connected, the service flows associated with each CM 110, and the quality of service associated with each of the service flows. CM/SF manager 240 may use data gathered through the process of registration and the setting up of service flows to determine this information.

System manager 250 may include logic that controls many aspects of CMTS 120. For example, system manager 250 may determine the fragmentation mode in which scheduler 210 operates. System manager 250 may consider parameters relating to the processing load of CMTS 120. For example, system manager 250 may consider one or more of the following parameters when determining the fragmentation mode: (1) CMTS processor occupancy or utilization; (2) traffic load; and (3) the number of CMs 110 and/or service flows. System manager 250 may manage and/or monitor the CMTS processor occupancy or utilization. CMTS 120 may include more than one processor and, in this case, system manager 250 may determine processor occupancy for each of the processors. System manager 250 may determine traffic load by counting packets. Packets may be counted at a number of different places within CMTS 120. System manager 250 may identify the number of CMs 110 and/or service flows from information it obtains from CM/SF manager 240.

System manager 250 may normally operate scheduler 210 in the multiple request mode because this mode is better for CMTS 120. When certain thresholds with respect to one or more of the above-identified parameters are exceeded, however, system manager 250 may cause scheduler 210 to transition to the piggyback mode, thereby off-loading some of the processing from CMTS 120.

Figure 4:
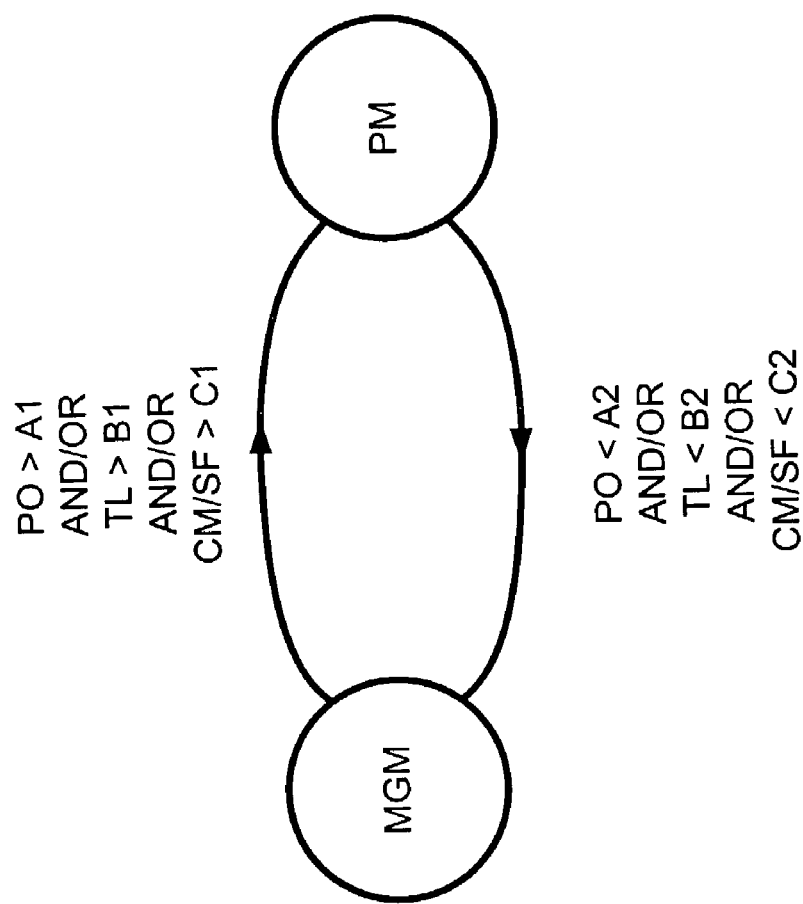
FIG. 4 is an exemplary state flow diagram of the transitioning between modes by the cable modem termination system of FIG. 2 according to an implementation consistent with the principles of the invention.

FIG. 4 is an exemplary state diagram that illustrates the transitioning between the multiple grant and piggyback modes according to an implementation consistent with the principles of the invention. The decision of whether to transition from the multiple grant mode (MGM) to the piggyback mode (PM) may be based on whether the processor occupancy (PO) is greater than a threshold A1, whether the traffic load (TL) is greater than a threshold B1, whether the number of CMs 110 and/or service flows (CM/SF) is greater than a threshold C1, other factors, or some combination of these factors. The decision of whether to transition back to the multiple grant mode from the piggyback mode may be based on whether the processor occupancy (PO) is less than a threshold A2, whether the traffic load (TL) is less than a threshold B2, whether the number of CMs 110 and/or service flows (CM/SF) is less than a threshold C2, other factors, or some combination of these factors. These decisions may be made collectively for all CMs 110 or, alternatively, for each CM 110 or group of CMs 110.

The high and low thresholds (A1, A2; B1, B2; and C1, C2) may create hysteresis to prevent constant toggling between the modes. The thresholds may be configurable by an operator.

Exemplary Transition Processing

FIG. 5 is a flowchart of exemplary processing by CMTS 120 according to an implementation consistent with the principles of the invention. Processing may begin with CMTS 120 receiving a request for a transmission opportunity from a CM 110 (act 510). CM 110 may generate the request based on a needed amount of bandwidth to transmit a packet. The packet may include a small amount of data (e.g., 64 bytes) or a large amount of data (e.g., 1,518 bytes). The request may identify the number of time slots needed to transmit the packet.

CMTS 120 may analyze the request and schedule one or more transmission opportunities for CM 110. Assume that CMTS 120 determines that it cannot grant a single transmission opportunity that will satisfy the request from CM 110. In this case, CMTS 120 may grant a transmission opportunity that is less than that requested by CM 110 (act 520).

Before generating a MAP message that includes the grant, CMTS 120 may determine the current mode in which it is operating (act 530). For example, CMTS 120 may check the state of an internal register or obtain other information that identifies its current mode. CMTS 120 may also determine whether certain parameters warrant a transition to another mode (act 540). For example, if CMTS 120 is currently operating in the multiple grant mode, CMTS 120 may transition to the piggyback mode if one or more parameters, such as processor occupancy, traffic load, and the number of CMs 110 and/or service flows, exceed their corresponding thresholds. If CMTS 120 is currently operating in the piggyback mode, however, CMTS 120 may transition to the multiple grant mode if one or more of the parameters are less than their corresponding thresholds. As described above, the thresholds may include high and low thresholds to prevent constant toggling between the modes.

CMTS 120 may then generate transmission opportunities according to the fragmentation mode in which it is currently operating (acts 550 and 560). For example, in the multiple grant mode, CMTS 120 may generate a MAP message that includes multiple grants for CM 110. If these grants are still insufficient to satisfy the request from CM 110, CMTS 120 may include a grant pending indicator in the MAP message, which prevents additional requesting by CM 110 for the remainder of the packet. In the piggyback mode, on the other hand, CMTS 120 may generate a MAP message that includes only a single grant for CM 110. In this case, CM 110 will be responsible for requesting additional transmission opportunities.

CMTS 120 may transmit the MAP message to CM 110 via the downstream path (act 570). CM 110 may respond to the MAP message in the appropriate way, such as by transmitting data in it designated time slot(s) and, if necessary, requesting an additional transmission opportunity.

While acts 530 and 540 have been described as occurring during processing of a request from a CM 110, these acts may be constantly or periodically performed. For example, CMTS 120 may periodically determine whether a transition between fragmentation modes should occur based on the previously-described parameters. CMTS 120 may then transition between modes outside the context of processing any particular request.

CONCLUSION

Systems and methods consistent with the principles of the invention provide a mechanism for transitioning between fragmentation modes by a cable modem termination system. The transitioning between modes may be based on a number of operator-definable parameters and thresholds.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a cable routing system, concepts consistent with the principles of the invention can be implemented in any system, device, or chip that communicates with another system, device, or chip via one or more buses.

In addition, systems and methods have been described as processing packets. In alternate implementations, systems and methods consistent with the principles of the invention may process other, non-packet, data.

Also, while a series of acts has been described with regard to the flowchart of FIG. 5, the order of the acts may differ in other implementations consistent with the principles of the invention. Non-dependent acts may be performed in parallel.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method, performed by a cable modem termination system (CMTS), for transitioning between first and second fragmentation modes in a cable routing system, comprising:
    entering, by the CMTS, the first fragmentation mode;
    analyzing, by the CMTS, one or more processing parameters against one or more thresholds; and
    transitioning, by the CMTS, to the second fragmentation mode when at least one of the one or more processing parameters exceeds the one or more thresholds.

2. The method of claim 1, wherein the first fragmentation mode is a multiple grant mode and the second fragmentation mode is a piggyback mode.

3. The method of claim 1, wherein the one or more processing parameters include information regarding at least one of processor occupancy, traffic load, and number of cable modems or service flows.

4. The method of claim 3, wherein the one or more processing parameters include information regarding at least two of processor occupancy, traffic load, and number of cable modems or service flows.

5. The method of claim 1, further comprising:
    establishing the one or more thresholds based on one or more thresholds from an operator.

6. The method of claim 1, wherein the one or more thresholds includes one or more high thresholds and one or more low thresholds corresponding to each of the one or more processing parameters.

7. The method of claim 6, wherein the analyzing the one or more processing parameters includes:
    determining one or more current values for the one or more processing parameters, and
    comparing the one or more current values to the corresponding one or more high thresholds.

8. The method of claim 6, further comprising:
    determining one or more current values for the one or more processing parameters,
    analyzing the one or more current values against the one or more low thresholds, and
    transitioning back to the first fragmentation mode when at least one of the one or more current values is less than the corresponding one or more low thresholds.

9. The method of claim 1, further comprising:
    transitioning back to the first fragmentation mode when at least one of the one or more processing parameters is less than the one or more thresholds.

10. A system for transitioning between a multiple grant mode and a piggyback mode within a cable routing environment, comprising:
    means for entering the multiple grant mode;
    means for analyzing the one or more processing parameters against one or more thresholds; and
    means for transitioning to the piggyback mode when at least one of the one or more processing parameters exceeds the one or more thresholds.

11. The system of claim 10, further comprising:
    means for transitioning back to the multiple grant mode when at least one of the one or more processing parameters is less than the one or more thresholds.

12. A cable modem termination system connected to a plurality of cable modems, comprising:
    a scheduler configured to schedule transmission opportunities for the cable modems, the scheduler operating in a plurality of fragmentation modes, the scheduling of transmission opportunities differing among the fragmentation modes; and a system manager configured to:
compare one or more processing parameters to one or more thresholds, and
cause the scheduler to transition among the fragmentation modes based on a result of the comparison.

13. The system of claim 12, wherein the fragmentation modes include a multiple grant mode and a piggyback mode.

14. The system of claim 12, wherein the one or more processing parameters include information regarding at least one of processor occupancy, traffic load, and number of cable modems or service flows serviced by the cable modem termination system.

15. The system of claim 14, wherein the one or more processing parameters include information regarding at least two of processor occupancy, traffic load, and number of cable modems or service flows serviced by the cable modem termination system.

16. The system of claim 14, wherein the system manager is further configured to establish the one or more thresholds based on one or more thresholds from an operator.

17. The system of claim 14, wherein the one or more thresholds include one or more high thresholds and one or more low thresholds corresponding to each of the one or more processing parameters.

18. The system of claim 17, wherein when comparing the one or more processing parameters, the system manager is configured to:
determine one or more current values for the one or more processing parameters, and
compare the one or more current values to the corresponding one or more high thresholds.

19. the system of claim 18, wherein w hen causing the scheduler to transition, the system manager is configured to:
instruct the scheduler to transition to another one of the fragmentation modes when the one or more current values exceed the corresponding one or more high thresholds.

20. The system of claim 17, wherein when comparing the one or more processing parameters and causing the scheduler to transition, the system manager is configured to:
determine one or more current values for the one or more processign parameters,
analyze the one or more current values against the one or more low thresholds, and
cause the scheduler to transition to another one of the fragmentation modes when at least one of the one or more current values is less than the corresponding one or more low thresholds.

21. The system of claim 12, wherein when causing the scheduler to transition, the system manager is configured to:
instruct the scheduler to switch to another one of the fragmentation modes when at least one of the one or more processing parameters exceeds the one or more thresholds.

22. The system of claim 12, wherein when causing the scheduler to transition, the system manager is configured to:
instruct the scheduler to switch to another one of the fragmentation modes when at least one of the one or more processing parameters is less than the one or more thresholds.

23. A cable modem termination system connected to a plurality of cable modems, comprising:
a scheduler configured to schedule transmission opportunities for the cable modems, the scheduler operating in a multiple grant mode and a piggyback mode at different times, the scheduling of transmission opportunities differing based on which of the multiple grant mode and the piggyback mode the scheduler is operating; and
a system manager configured to:
instruct the scheduler to enter the multiple grant mode,
compare one or more processing parameters to one or more thresholds, and
cause the scheduler to transition to the piggyback mode when at least one of the one or more processing parameters exceeds the one or more thresholds.

24. A cable modem termination system connected to a plurality of cable modems, comprising:
a scheduler configured to schedule transmission opportunities for the cable modems, the scheduler operating in a multiple grant mode and a piggyback mode at different times, the scheduling of transmission opportunities differing based on which of the multiple grant mode and the piggyback mode the scheduler is operating; and
a system manager configured to:
instruct the scheduler to enter the piggyback mode,
compare one or more processing parameters to one or more thresholds, and
cause the scheduler to transition to the multiple grant mode when at least one of the one or more processing parameters is less than the one or more thresholds.

* * * * *